252-103 CROSS REFERENCE EXAMINER

Patented Sept. 28, 1954 2,690,383

UNITED STATES PATENT OFFICE 2,690,383

ETCHING OF CRYSTAL CONTACT DEVICES

Stanley Edwin Bradshaw, Highgate, London, England, assignor to The General Electric Company Limited, London, England No Drawing. Application April 29, 1952, Serial No. 285,077

8 Claims. (Cl. 41—42)

This invention relates to the manufacture of crystal contact devices. The invention is concerned in particular with crystal contact devices having a semi-conducting element of germanium. It is to be understood that in this specification a germanium element means an element of germanium of high purity with or without small quantities of added impurities.

In the manufacture of such devices it is well known to include the step of etching the contact surface of the germanium element, and a number of methods of carrying this out have previously been proposed. These include dipping the germanium element in a strong acid such as hydrofluoric acid, and passing an electric current between the surface of the germanium element and another electrode while both are immersed in a conducting liquid such as Langmuir's solution. Most of the methods previously proposed suffer from one or more disadvantages such as being unsuitable for factory processing of numerous elements, employing dangerous chemicals, or attacking of the support on which the element is mounted by the chemical re-agent used.

It is an object of the present invention to provide a method of manufacturing a crystal contact device having a semi-conducting element of germanium, in which etching of the contact surface of the germanium element is carried out with a reagent which is free from one or more of the disadvantages mentioned above.

According to the invention, a method of manufacturing a crystal contact device having a semiconducting element of germanium includes the step of etching the contact surface of the germanium element with an aqueous solution of at least one alkali metal hypochlorite.

The optimum etching time depends upon the concentration and temperature of the solution, a weak solution or a lower temperature requiring a longer etching time and vice versa, and by a proper choice of these factors any desired optimum time of etching may be obtained. It has also been found that a useful improvement is obtained if the hypochlorite solution contains some sodium hydroxide or potassium hydroxide.

One method in accordance with the present invention will now be described by way of example.

In this method germanium elements are prepared by the method described in United States patent specification No. 56,943 in which small quantities of germanium powder are fused on a refractory support in a suitable inert atmosphere to provide germanium elements in the form of globules. The elements thus produced are mounted on metallic supports by soldering, and are ground to provide them with flat contact surfaces each having an area of about 2 sq. mm.

The contact surfaces of the germanium elements are then etched in the following manner. A batch of approximately one thousand of the mounted elements is immersed in approximately one litre of a solution which consists of 2% by weight of sodium hypochlorite and 2% by weight of sodium hydroxide, the remainder being water. The solution is kept in gentle motion at room temperature and after fifteen minutes the elements are removed from the solution, washed in water, and dried. The elements are then ready to be used in the assembly of the complete crystal contact devices.

In the example described above, part or the whole of the sodium hypochlorite in the etching solution may be replaced by an equal quantity of potassium hypochlorite, and part or the whole of the sodium hydroxide in the solution may be replaced by an equal quantity of potassium hydroxide, without substantially altering the effectiveness of the process.

I claim:

1. In the manufacture of a crystal contact device having a semi-conducting element of germanium in which manufacture a contact surface has been formed on the germanium element; that improvement constituting etching the contact surface with an aqueous solution of an alkali metal hypochlorite.

2. In the manufacture of a crystal contact device having a semi-conducting element of germanium in which manufacture a contact surface has been formed on the germanium element; that improvement constituting etching the contact surface with an aqueous solution of a member of the group consisting of sodium hypochlorite and potassium hypochlorite.

3. In the manufacture of a crystal contact device having a semi-conducting element of germanium in which manufacture a contact surface has been formed on the germanium element; that improvement constituting etching the contact surface with an aqueous solution of an alkali metal hypochlorite and a member of the group consisting of sodium hydroxide and potassium hydroxide.

4. In the manufacture of a crystal contact device having a semi-conducting element of germanium in which manufacture a contact surface has been formed on the germanium element; that improvement constituting etching the contact surface with an aqueous solution of a member of the group consisting of sodium hypochlorite and potassium hypochlorite and a member of the group consisting of sodium hydroxide and potassium hydroxide.

5. In the manufacture of a crystal contact device having a semi-conducting element of germanium in which manufacture a contact surface has been formed on the germanium element; that improvement constituting etching the contact surface with an aqueous solution of an alkali metal hypochlorite at a concentration of about two per cent by weight.

6. In the manufacture of a crystal contact device having a semi-conducting element of germanium in which manufacture a contact surface has been formed on the germanium element; that improvement constituting etching the contact surface with an aqueous solution of a member of the group consisting of sodium hypochlorite and potassium hypochlorite at a concentration of about two per cent by weight.

7. In the manufacture of a crystal contact device having a semi-conducting element of germanium in which manufacture a contact surface has been formed on the germanium element; that improvement constituting etching the contact surface with an aqueous solution of an alkali metal hypochlorite at a concentration of about two per cent by weight and a member of the group consisting of sodium hydroxide and potassium hydroxide at a concentration of about two per cent by weight.

8. In the manufacture of a crystal contact device having a semi-conducting element of germanium in which manufacture a contact surface has been formed on the germanium element; that improvement constituting etching the contact surface with an aqueous solution of a member of the group consisting of sodium hypochlorite and potassium hypochlorite at a concentration of about two per cent by weight and a member of the group consisting of sodium hydroxide and potassium hydroxide at a concentration of about two per cent by weight.

References Cited in the file of this patent

UNITED STATES PATENTS

| Number | Name | Date |
| --- | --- | --- |
| 691,671 | Sjoo et al. | Jan. 21, 1902 |
| 2,542,727 | Theurer | Feb. 20, 1951 |
| 2,564,549 | Stargardter | Aug. 14, 1951 |